Oct. 2, 1951     O. H. PETERSEN     2,570,151
CYCLIC GEAR MECHANISM
Filed Sept. 9, 1949
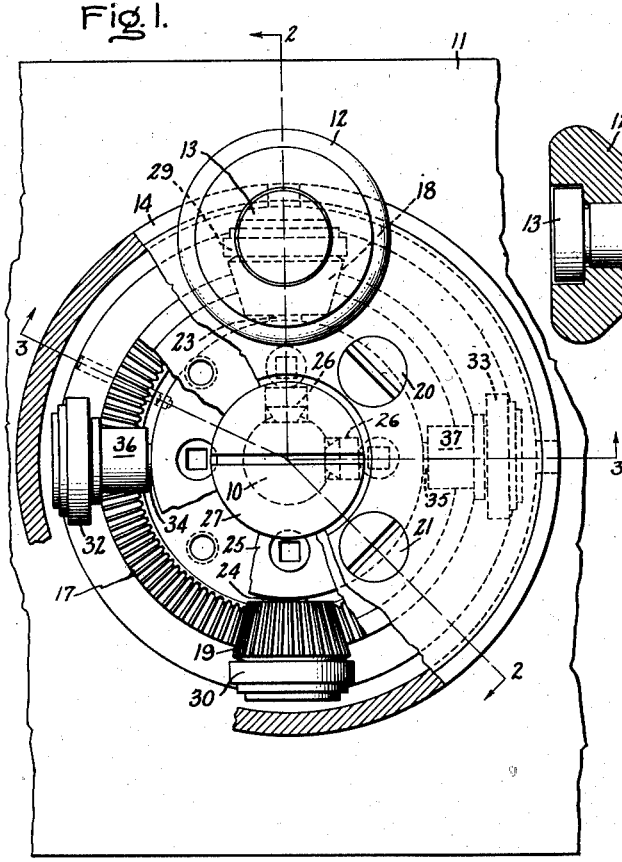
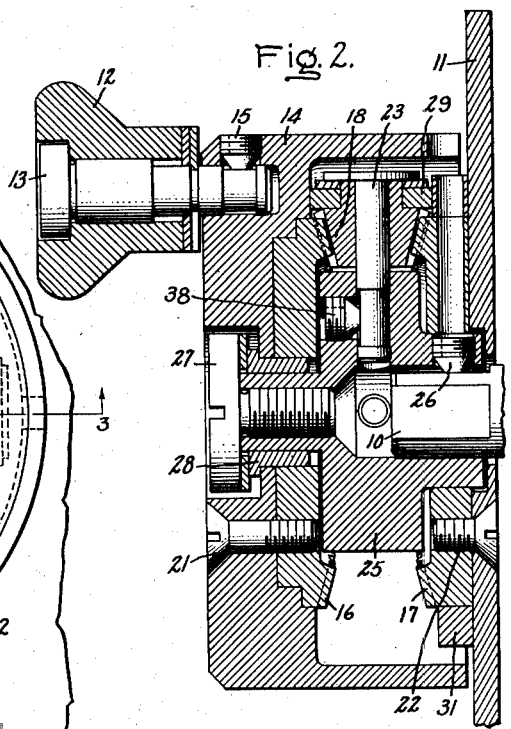
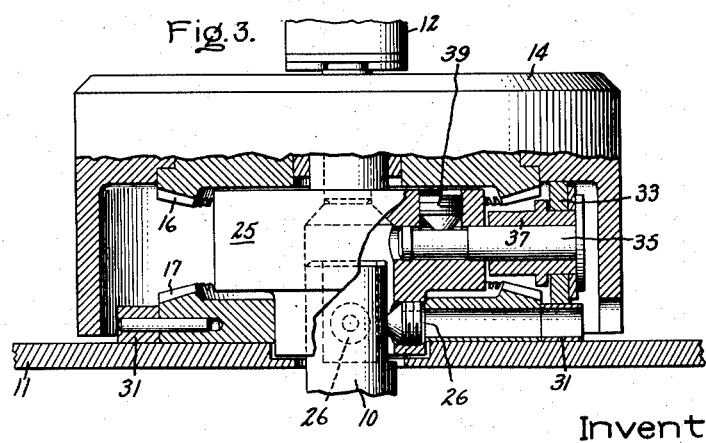
Inventor:
Otto H. Petersen,
by Merton D. Morse
His Attorney.

Patented Oct. 2, 1951

2,570,151

UNITED STATES PATENT OFFICE 2,570,151

CYCLIC GEAR MECHANISM

Otto H. Petersen, Fayetteville, N. Y., assignor to General Electric Company, a corporation of New York Application September 9, 1949, Serial No. 114,711

2 Claims. (Cl. 74—799)

This invention relates generally to cyclic gear mechanisms and more particularly to a specific form of such a mechanism utilizing beveled gears in a differential arrangement.

The use of cyclic gear trains for effecting speed reductions is well known. For instance, such cyclic reduction trains are encountered in screw machines, in lathe controls, in dial drive mechanisms, and in automobile transmission systems. In applications where freedom from backlash in the gears is not particularly important, there is no particular difficulty in cutting gears in a manner to insure complete freedom from binding. However, where the backlash must be kept to a minimum, special measures must be taken to prevent binding and to insure smooth operation.

It is an object of my invention to provide a new and improved cyclic gear mechanism having practically complete freedom from backlash.

Another object of my invention is to provide a reduction drive mechanism utilizing bevel gears in a differential arrangement that permits substantially complete freedom from backlash without any tendency towards binding.

A further object of my invention is to provide a new and improved system for mating bevel gears in a differential arrangement which relieves the gears of the function of withstanding unavoidable thrusts and thereby reduces any tendency on the part of the gears to bind and wear unnecessarily.

For further objects and advantages and for a better understanding of the invention, attention is now directed to the following description. The features of my invention believed to be novel will be more particularly pointed out in the appended claims.

My invention is particularly concerned with a reduction gear mechanism for controlling delicate apparatus. However, it is in no way restricted to such an application, and the features of my invention may be applied to cyclic gear trains of any size.

In the drawing:

Fig. 1 is a plan view of a reduction gear mechanism embodying my invention, with part of a casing cut away to provide a more easily understood illustration of the internal structure;

Fig. 2 is a sectional view of the mechanism, as seen through the broken section line 2—2 looking in the direction of the arrows; and Fig. 3 is a partly sectionalized view of the mechanism, as seen through the broken section line 3—3 looking in the direction of the arrows.

Referring to the drawing and more particularly to Fig. 2, there is shown a shaft 10 projecting through a mounting plate 11. The function of the mechanism, which will now be described, is to permit a reduced drive of the shaft 10 by rotation of a knob 12, which is pivotally mounted on a pin 13, secured to a casing 14 by means of a set screw 15.

The drive from the casing 14 to the shaft 10 is provided through the medium of a pair of beveled sun gears 16 and 17 facing each other, and a pair of beveled pinions 18 and 19 which operate as planet gears. Sun gear 16 is secured to casing 14 by means of four screws, of which two screws 20 and 21 are visible in Fig. 1. Sun gear 17 is likewise secured to plate 11 by means of suitable screws, of which one screw 22 is visible in Fig. 2. Beveled pinions 18 and 19 are mounted on spider shafts 23 and 24 which project radially from a circular hub 25, the whole constituting what is commonly referred to as a spider. The spider is fastened to the shaft 10 by means of a pair of set screws 26. The casing 14 is rotatably mounted on the hub 25 and is held by means of a flat-headed screw 27 which is threaded into hub 25 and abuts against a collar 28, press-fitted into the casing 14.

The construction of the mechanism, to the extent that it has been described above, is well known in the art. In operation, the spider is maintained in axial position by its fastening to the shaft 10, and the casing 14 is rotatably mounted on the spider. Sun gears 16 and 17 are provided with identical tooth configurations and mesh with the planet gears carried on the spider. When the casing 14 is rotated, sun gear 16 moves with it and engages planet gears 18 and 19, causing them to spin on the radial spider shafts 23 and 24 at a rate determined by the relative rotation of member 25 with respect to the casing 14. However, since the planet gears also engage the stationary sun gear 17, member 25 has a relative motion in a positive sense with respect to gear 17, equal to its relative motion in a negative sense with respect to gear 16. As a result, the hub 25 rotates at half the absolute speed of casing 14, and thereby provides a reduction in the ratio of one to two in the drive of shaft 10.

The structure of the drive mechanism as thus far described would normally require any thrust transmitted from casing 14 to shaft 10 to be taken up by the tooth surfaces of sun gears 16 and 17 against the tooth surfaces of planet gears 18 and 19. Under these conditions, since it is necessary to cut the tooth configuration to very close tolerances in order to eliminate backlash, binding is apt to occur. The features of my invention which will now be described permit cutting the teeth to close tolerances and also permit the adjustment of the planet gears to provide a practically complete elimination of backlash, without incurring any risk of binding.

In accordance with my invention, instead of requiring the planet gears to take up the axial thrust of the casing 14, a form of roller bearing is provided for the purpose. Referring to Fig. 2, a disk or roller 29 is rotatably mounted on a collar provided by an outward projection of the hub of planet gear 18. A similar roller 30 is mounted on the hub of planet gear 19. These rollers bear against the inner face of casing 14 on one side, and against a ring 31 on the other side. Ring 31 is laid flat against mounting plate 11 and is concentric with ring gear 17. The inner face of casing 14 and the opposing face of ring 31 serve as races on which rollers 29 and 30 run. There is thus provided a form of roller bearing which takes up the axial thrust of casing 14 against shaft 10, and which also serves to maintain the planet gears 18 and 19 accurately positioned with respect to the sun gears 16 and 17.

The two rollers 29 and 30 are sufficient for the purpose for which they have been provided, but as a further refinement I have provided a second pair of rollers 32 and 33. These are mounted on a second pair of spider shafts 34 and 35 which extend axially from hub 25 and at right angles to the first set of spider shafts 23 and 24. Rollers 32 and 33 are mounted on collars 36 and 37, which locate them on their respective spider shafts in the same manner as the hubs of planet gears 18 and 19 locate rollers 29 and 30. In practice, the planet gears and the ring gears are preferably made of brass and the spider shafts and the rollers are preferably made of steel.

The rollers thus provide a practically frictionless means of axially locating the spider with respect to casing 14 and plate 11, and thereby control the meshing of the planet gears with the sun gears. When casing 14 is rotated, the rollers spin at substantially the same speed as the planet gears. However, the rollers take up the axial thrusts, and the function of the planet gears is then limited to establishing the speed ratio. Since the planet gears are not required to take up any axial thrusts, they may now be machined to much closer tolerances, in order to eliminate backlash, and binding does not occur.

In accordance with a further feature of my invention, spider shafts 23 and 24 can be adjusted radially with respect to hub member 25, and likewise spider shafts 34 and 35. The spider shafts are locked in place by suitable set screws, such as set screw 38 in Fig. 2, and 39 in Fig. 3. In adjusting the mechanism, the spider shafts 23 and 24 are pushed radially inward towards the axis of member 25, until a point is reached where the planet gears 18 and 19 roll freely and without backlash on sun gears 16 and 17. This feature permits a very fine adjustment of the mechanism and eliminates the necessity of relying entirely on accuracy in machining the gears for the prevention of backlash.

Although a specific embodiment has been shown and described, it will, of course, be understood that various modifications may be made without departing from the invention. For example, while the rollers 29 and 30 are preferably rotatable with respect to planet gears 18 and 19, they may alternatively be integral therewith. In such case, the bearing surface of the roller portion should lie approximately on the pitch line of the associated gear portion to avoid undue roller slippage. It is also apparent that in some cases it may be desirable to have planet gears on all four spider shafts. The appended claims are therefore intended to cover any such modifications falling within the true spirit and scope of the invention.

What I claim as new and desire to secure by Letters Patent of the United States is:

1. A cyclic gear mechanism comprising a pair of spaced sun bevel gears mounted in parallel planes in mutually facing relationship on an axis, a hub member, a pair of stub shafts each affixed to said hub member at one end and extending therefrom in diametrically-opposite directions, a pair of planet bevel gears respectively mounted on said stub shafts, said hub member being interposed between said sun gears and, in combination with said stub shafts, constituting a spider rotatable on said axis, said planet gears each meshing with both said sun gears, a pair of fixed bearing races concentrically mounted with respect to said sun gears and in similar opposing relation, a pair of rollers rotatably mounted on said respective shafts and each bearing against both said races for accurately positioning said spider between said sun gears, and means for individually adjusting each of said shafts radially to provide accurate adjustment of the meshing of said gears.

2. A cyclic gear reduction mechanism comprising a mounting plate having an opening therein, a driven shaft extending through said opening in a transverse direction, a hub member secured to said shaft, a pair of diametrically opposed radial shafts affixed to said hub member, a driving casing rotatably mounted on said driven shaft, a pair of similar sun bevel gears located in parallel planes in mutually facing relationship and concentric with the axis of said driven shaft, one of said sun gears being affixed to said rotatable casing and the other being affixed to said mounting plate, a pair of similar planet beveled gears respectively journaled on said diametrically opposed radial shafts, said hub member being interposed between said sun gears and, in combination with said radial shafts, constituting a spider rotatable on said axis, said planet gears each meshing with both said sun gears and thereby causing said driven shaft to be driven through said spider, in response to rotation of said casing, so as to rotate at half the rate of said casing, a pair of races concentrically mounted with respect to said sun gears and having opposed flat surfaces parallel to said planes, said races also being respectively affixed to said casing and said mounting plate, a pair of rollers also rotatably mounted on said respective radial shafts, said rollers each being constructed and arranged to bear against both said races for accurately positioning said spider between said sun gears and to take up thrust transmitted through said casing to said driven shaft, and means for individually adjusting the radial spacing of each of said planet gears from said axis, thereby to provide accurate adjustment of the meshing of said planet gears with said sun gears.

OTTO H. PETERSEN.

REFERENCES CITED

The following references are of record in the file of this patent:

UNITED STATES PATENTS

| Number | Name | Date |
|---|---|---|
| 741,931 | Sandell | Oct. 20, 1903 |
| 941,101 | Ross | Nov. 23, 1909 |
| 1,414,479 | Mays | May 2, 1922 |
| 1,484,565 | Rikes | Feb. 19, 1924 |
| 1,527,335 | Uppercu | Feb. 24, 1925 |
| 1,786,338 | Donohue | Dec. 23, 1930 |
| 1,970,251 | Rossmann | Aug. 14, 1934 |
| 1,994,719 | Lichty | Mar. 19, 1935 |

FOREIGN PATENTS

| Number | Country | Date |
|---|---|---|
| 81,234 | Germany | May 23, 1895 |